United States Patent [19]

Crow et al.

[11] 4,162,077

[45] Jul. 24, 1979

[54] WIDE CHANNEL SEAL

[75] Inventors: David E. Crow, Glastonbury, Conn.; Nathan E. Harrison, Palm Beach Gardens, Fla.

[73] Assignee: United Technologies Corporation, Hartford, Conn.

[21] Appl. No.: 865,267

[22] Filed: Dec. 28, 1977

[51] Int. Cl.$^2$ .................. F16J 15/44; F16J 15/40
[52] U.S. Cl. .................................... 277/53; 277/201;
    277/214; 277/215; 415/172 A; 415/110
[58] Field of Search ........................... 277/53–57;
    277/201, 202, 214, 215; 415/110–113, 170 R,
    172 R, 172 A

[56] References Cited

U.S. PATENT DOCUMENTS

| | | | |
|---|---|---|---|
| 2,963,268 | 12/1960 | Smile et al. | 277/3 X |
| 2,963,307 | 12/1960 | Bobo | 277/53 |
| 3,083,975 | 4/1963 | Kelly | 277/53 |
| 3,411,794 | 11/1968 | Allen | 277/75 X |
| 3,514,112 | 5/1970 | Pettengill | 415/172 A X |
| 3,575,523 | 4/1971 | Gross | 415/172 A |
| 3,846,899 | 11/1974 | Gross | 415/174 X |
| 4,063,742 | 12/1977 | Watkins | 277/53 |

FOREIGN PATENT DOCUMENTS 793886  4/1958  United Kingdom ...................... 277/53

*Primary Examiner*—Robert S. Ward, Jr.
*Attorney, Agent, or Firm*—Robert C. Walker

[57] ABSTRACT

A wide channel seal for impeding the leakage of a gaseous medium between the rotor and stator of a rotary machine is disclosed. Various construction details including the use of a honeycomb facing material on the stator side of the channel and the use of a grooved cylindrical surface on the rotor side of the channel are discussed. A comparison in sealing effectiveness between a conventional wide channel seal and the wide channel seal of the present invention is made.

7 Claims, 4 Drawing Figures

WIDE CHANNEL SEAL

BACKGROUND OF THE INVENTION

1. Field of the Invention

This invention relates to rotary machines and particularly to wide channel type seals between the rotating and stationary components of a machine.

2. Description of the Prior Art

Rotary seals are conventionally disposed between the rotating and stationary components of a rotary machine to impede the leakage of a fluid medium therebetween. Labyrinth seals are widely used with gaseous mediums to reduce the kinetic energy of the leakage fluid by throttling and expanding the medium. Labyrinth seals are formed of a sealing surface or land on one component and a restrictive ring on an opposing component wherein the ring projects into close proximity with the land. A plurality of restrictive rings are commonly required in series to effect sufficient energy dissipation.

In gas turbine engines labyrinth seals are typically used to prevent the excessive leakage of air into the bearing compartments and to prevent the excessive leakage of air externally of the working medium flow path from one engine stage to another. One construction for sealing between adjacent stages in the turbine section of an engine is shown in U.S. Pat. No. 3,514,112 to Pettengill entitled "Reduced Clearance Seal Construction". A plurality of restrictive rings in Pettengill project toward corresponding sealing surfaces. A throttle aperture is formed between each ring and its corresponding sealing surface. An expansion chamber is formed between each pair of adjacent rings. Air leaking through the first throttle aperture flows through the downstream chambers and apertures establishing a stable pressure differential across each ring of the labyrinth.

Labyrinth sealing is an effective technique for impeding the flow of a gaseous medium from a region of higher pressure in a gas turbine engine to a region of lower pressure at moderate clearance levels between relatively rotating components. Where a lesser clearance can be provided a second type of rotary seal, a "wide channel seal", has been found to be more effective than the labyrinth seal at an equivalent clearance. A wide channel seal is formed of two concentric cylindrical lands, one integrally mounted with the rotating component and one integrally mounted with the stationary component. The lands are closely spaced in opposing relationship to restrict the flow of the fluid medium between the two components by imposing frictional flow losses on the medium. One of the lands conventionally is covered with a honeycomb material to greatly increase flow turbulence within the channel.

Wide channel seals are less costly to manufacture and offer a weight saving when compared to labyrinth seals. Significant technical effort is being directed, therefore, to extending the clearance range of effective wide channel seals to make such seals suitable for use in engines requiring seal clearances of varied dimensions.

SUMMARY OF THE INVENTION

A primary aim of the present invention is to minimize the leakage of a fluid medium between the rotating and stationary elements of a rotary machine. Aerodynamic resistance to flow in a seal which is effective over a varied clearance dimension is sought. In one aspect of the invention, a specific object is to provide a wide channel seal structure having improved sealing characteristics at increased clearances.

According to the present invention, a wide channel type seal between two components adapted for relative rotations is formed of a honeycomb cylindrical surface on one component and a grooved cylindrical surface on the opposing component.

A primary feature of the present invention is the wide channel type seal for impeding the leakage of a gaseous medium between spaced rotor and stator elements of a rotary machine. One of the channel forming members of the seal is fabricated of a honeycomb type material. The opposing channel forming member has one or more circumferentially extending grooves disposed therein.

A principle advantage of the present invention is improved resistance to leakage flow. In comparison to conventional wide channel seals improved resistance at increased clearances has been demonstrated. The honeycomb material dissipates the energy of the medium gases flowing in proximity thereto. The circumferentially extending grooves of the opposing channel member cause high energy gases flowing in proximity to the opposing channel member to be interchanged with lower energy gases flowing in proximity to the honeycomb faced channel member.

DETAILED DESCRIPTION

Figure 1:
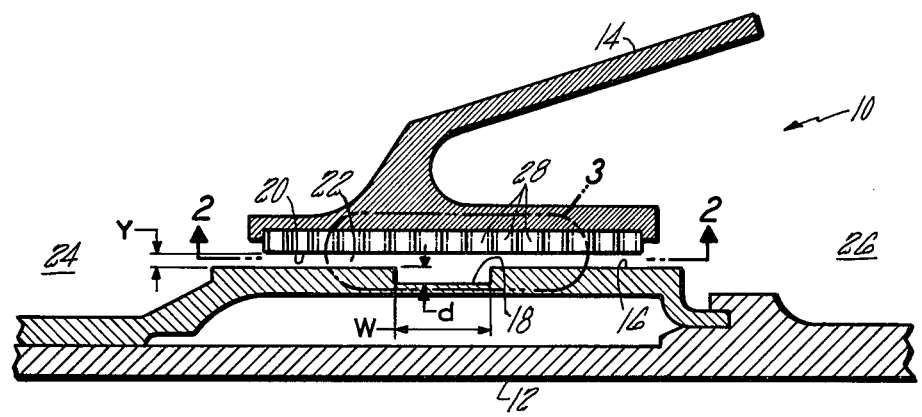
FIG. 1 is a partial sectional view taken through a wide channel seal constructed in accordance with the present invention.

A wide channel type seal 10 is shown in FIG. 1 between the relatively rotating components of a rotary machine. The seal is formed between a rotating or rotor assembly 12 and a stationary or stator assembly 14. A cylindrical seal land 16 having at least one circumferentially extending groove 18 disposed therein is supported by the rotor 12. A cylindrical honeycomb strip 20 is attached to the stator 14 and radially opposes the land 16 to form an annular channel 22 therebetween. The seal separates a region of higher pressure 24 from a region of lower pressure 26. The honeycomb strip comprises a multiplicity of individual cells 28 which are open to the channel 22. As illustrated the cells are hexagonal, although other geometries may be equally suitable.

Figure 3:
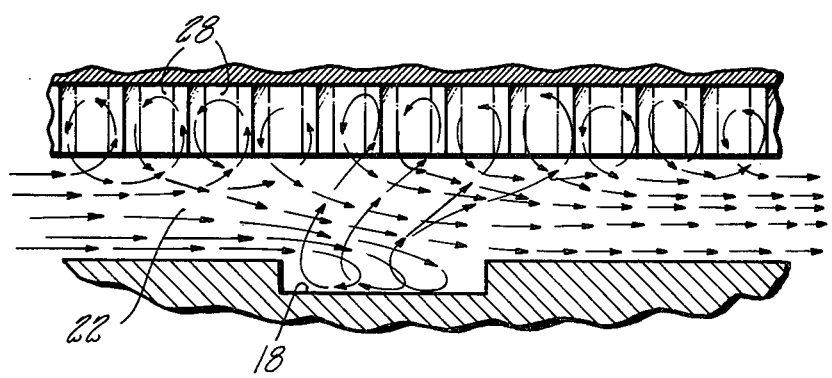
FIG. 3 is an enlarged segment of FIG. 1 wherein the aerodynamic effect of the circumferentially extending groove is illustrated.

During the operation of a machine in which the wide channel seal 10 is incorporated, the pressure differential between the higher pressure region 24 and the lower pressure region 26 causes the fluid in the higher pressure region to flow through the annular channel 22. Strong local vortices are generated within each cell 28 as the adjacent fluid passes the cell openings. The vortices extend partially into the channel 22 and dissipate the energy of the medium gases flowing in proximity thereto. Medium gases flowing in proximity to the channel forming member opposing the honeycomb are initially unimpeded by the honeycomb vortices. As flow passes each circumferential groove, however, the flow is deflected into the groove, swirled in the groove, and redirected outwardly across the channel 22 into proximity to the honeycomb faced member where the energy of the gases is further dissipated. Simultaneously, low energy gases along the honeycomb faced member are displaced across the channel to the opposing member. Resultantly, the medium gases exit the channel 22 at a nearly uniform velocity. The aerodynamic effects described are pictorially illustrated in FIG. 3. The larger arrows in FIG. 3 represent high velocity, high energy gases and the smaller arrows represent lower velocity, lower energy gases. Note that flow exiting the channel 22 to the lower pressure region 26 is at a nearly uniform, relatively low velocity.

Figure 2:
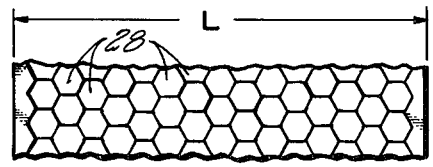
FIG. 2 is a directional view taken along the line 2—2 as shown in FIG. 1.

The honeycomb cells shown in the drawing have a hexagonal shaped cross section as viewed in FIG. 2 from the axis of the seal. The hexagonal shape is representative of cell patterns in which the vortex generating cavities are staggered with respect to the flow through the channel. The staggered cell pattern increases the impeding effect of each vortex over the effect that is obtainable with axially aligned vortices. Other staggered geometrics such as diamond shapes are correspondingly effective. The concepts disclosed herein, however, are not exclusively limited to staggered geometrics.

Tight clearance control between the relatively rotating components of a machine is obtainable with apparatus constructed in accordance with the concepts taught herein. The honeycomb structure has a very low density and is abradable during operation of the machine. The initial channel width Y, as shown in FIG. 1, may be set at less than the expected relative radial excursion of the rotor 12 so that at the condition of maximum excursion the seal land 16 abrades the outer portion of the honeycomb strip 20 to provide a zero (0) clearance at maximum rotor excursion.

Damage to the honeycomb structure during interference between the strip 20 and the land 16 is minimized on one construction wherein the abrasive coating is affixed to the inwardly facing surface of the land 16. The abrasive coating severs the interfering honeycomb from the remaining structure to avoid the deformation of material into the cell openings and the resultant decrease in the strength of the vortices generated by the deformed structure. Silicon carbide and aluminum oxide have been found to be effective abrasive materials, although, other coatings having similar qualities are expected to produce comparable results.

In a gas turbine engine environment seals are employed to prevent the leakage of gaseous medium between regions having a pressure differential ratio on the order of one and one tenth (1.1) to two and three tenths (2.3). The axial length (L) of the wide channel seal and the number of circumferential grooves is dependent upon the extent of leakage which is tolerable in each particular environment. Where moderate leakage is tolerable a shorter axial length seal enables reduced weight and cost. Where minimal leakage is required a longer axial length seal is employed. The optimum width (w) and depth (d) of the circumferential groove is dependent upon the maximum seal clearance dimension (Y). A clearance to width ratio (Y/w) on the order of one hundredth (0.01) has been found to be effective. Correspondingly, width (w) to depth (d) ratios (w/d) on the order of six (6) have been found to be effective.

Further, empirical evaluation may show some variance from the above ratios to be the optimum conditions, however, such further refinement as may occur is clearly within the scope of the invention claimed.

Figure 4:
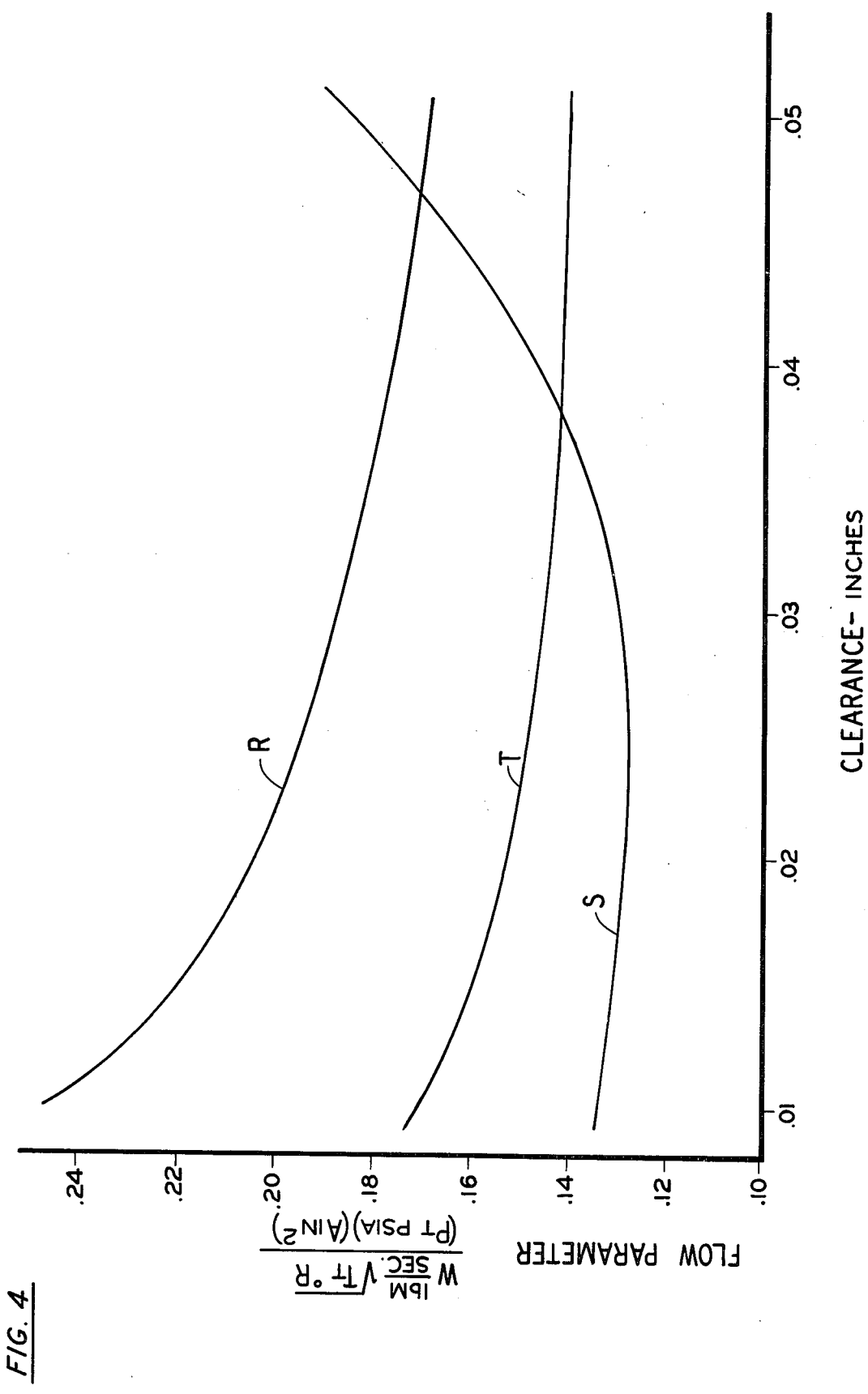
FIG. 4 is a graph showing comparative leakage characteristics between a labyrinth type seal, a conventional wide channel type seal and a wide channel seal constructed in accordance with the present invention.

The FIG. 4 graph demonstrates the leakage characteristics of the present wide channel type seal in comparison to corresponding leakage characteristics of a prior art labyrinth type seal and a prior art conventional, labyrinth type seal. The comparison is made up to clearance dimensions (Y) of fifty thousandths (0.050) of an inch. Leakage is illustrated in terms of flow parameter $$\frac{\omega \sqrt{T_T}}{P_T(A)}$$

where:
   $\omega$ is flow rate in pounds per second;
   $T_T$ is total temperature in degrees Rankine;
   $P_T$ is total pressure in pounds per square inch absolute; and
   A is channel cross section area in square inches.

Data is plotted for a pressure ratio of one and one half (1.5) across a seal having an axial length of two and six tenths (2.6) inches. The labyrinth seal includes five (5) knife edges stepped up to a one half (0.05) inch pitch. The leakage characteristics of the labyrinth seal are plotted as curve R. The conventional, wide channel seal included a honeycomb material adhered to the stationary, channel forming member. The leakage characteristic of the conventional wide channel seal is illustrated by the curve S. The wide channel seal embodying concepts of the present invention which was tested included a honeycomb material adhered to the stationary channel forming member and a single circumferential groove in the opposing land. The groove was spaced at the midpoint of the seal as illustrated in FIG. 1 and had a width (w) of six tenths (0.6) of an inch and a depth (d) of one tenth (0.1) of an inch. The leakage characteristics of the present seal are illustrated by the curve T. Note that at clearances of forty thousandths (0.040) of an inch and greater the grooved, wide channel seal exhibits demonstrably improved sealing characteristics. It is in environments requiring comparatively large clearances that the present seal has its greatest utility.

Although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. A seal structure of the type for impeding the leakage of a gaseous medium between the rotor and stator assemblies of a rotary machine wherein said structure comprises a cylindrical land having a honeycomb material adhered thereto and an opposing cylindrical land having a circumferentially extending groove disposed therein.

2. The apparatus according to claim 1 wherein said groove has a width (w) and a depth (d) and wherein the ratio of said width to said depth (w/d) is approximately six (6).

3. The apparatus according to claim 1 which has a plurality of circumferentially extending grooves disposed in the opposing cylindrical land.

4. The apparatus according to claim 3 wherein said grooves have widths (w) and depths (d) and wherein the ratios of said widths to said depths (w/d) are approximately six (6).

5. A seal structure of the type for impeding the leakage of a gaseous medium between the rotor and stator assemblies of a gas turbine engine from a region of higher pressure to a region of lower pressure, comprising:
   a first cylindrical seal land having a honeycomb material adhered thereto; and
   a second cylindrical seal land opposing said first land to form an annular channel therebetween wherein said second land has a circumferentially extending groove disposed therein opening to said channel such that medium gases flowing through the annular channel are drawn into said groove and are redirected back across the channel against the honeycomb material of said first land.

6. The apparatus according to claim 2 wherein a channel having a width (Y) is formed between the honeycomb land and the opposing land and wherein the ratio of the width (Y) to the width of the groove (w) is approximately one hundredth (0.01).

7. The apparatus according to claim 4 wherein a channel having a width (Y) is formed between the honeycomb land and the opposing land and wherein the ratio of the width (Y) to the width of the grooves (w) is approximately one hundredth (0.01).

* * * * *